(12) United States Patent
Liu et al.

(10) Patent No.: US 11,281,580 B2
(45) Date of Patent: Mar. 22, 2022

(54) EDGE DEVICE TRIGGERING A WRITE-AHEAD LOGGING (WAL) LOG WHEN ABNORMAL CONDITION OCCURS

(71) Applicant: SENSETIME INTERNATIONAL PTE. LTD., Singapore (SG)

(72) Inventors: Zuxi Liu, Singapore (SG); Shuai Zhang, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 16/896,699

(22) Filed: Jun. 9, 2020

(65) Prior Publication Data

US 2021/0191862 A1 Jun. 24, 2021

Related U.S. Application Data

(63) Continuation of application No. PCT/IB2020/052288, filed on Mar. 13, 2020.

(30) Foreign Application Priority Data

Dec. 23, 2019 (SG) .......................... 10201913065Q (51) Int. Cl.
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/0655* (2013.01); *G06F 3/0679* (2013.01); *G06F 2212/60* (2013.01)

(58) Field of Classification Search
CPC .. G06F 12/0802; G06F 3/0679; G06F 3/0604; G06F 3/0655; G06F 2212/60
See application file for complete search history.

(56) References Cited

U.S. PATENT DOCUMENTS

| | | | |
|---|---|---|---|
| 6,173,292 B1 * | 1/2001 | Barber | G06F 11/1471 707/682 |
| 2005/0273650 A1 | 12/2005 | Tsou | |
| 2007/0124552 A1 * | 5/2007 | Chen | G06F 11/1441 711/162 |
| 2012/0023506 A1 * | 1/2012 | Maeckel | G06F 9/485 719/318 |

(Continued)

FOREIGN PATENT DOCUMENTS

| CN | 104216659 A | 12/2014 |
|---|---|---|
| CN | 104954446 A | 9/2015 |

(Continued)

OTHER PUBLICATIONS

Search Report and Written Opinion for Singapore Application No. 10201913065Q, dated Feb. 6, 2020, 10 pages.

(Continued)

*Primary Examiner* — Tammara R Peyton (57) ABSTRACT

Embodiments of the present description provide a data processing method and apparatus, and an edge device. A currently received message is written to a first area of a local disk, and upon writing the currently received message to the first area of the local disk, the currently received message is buffered to a cache. When an edge device is restarted, data in the cache may be restored according to data stored in the first area of the local disk.

15 Claims, 3 Drawing Sheets

(56) References Cited

U.S. PATENT DOCUMENTS

| | | | | |
|---|---|---|---|---|
| 2013/0223135 A1* | 8/2013 | Koyama | ............... | G11C 5/14 |
| | | | | 365/149 |
| 2015/0193342 A1* | 7/2015 | Ohara | ............... | G06F 12/0802 |
| | | | | 711/120 |
| 2018/0307602 A1* | 10/2018 | Xu | ............... | G06F 11/1612 |
| 2020/0257450 A1 | 8/2020 | Zeng et al. | | |

FOREIGN PATENT DOCUMENTS

| | | |
|---|---|---|
| CN | 107844386 A | 3/2018 |
| CN | 109684132 A | 4/2019 |
| EP | 3382561 A1 | 10/2018 |
| WO | 2017112737 A1 | 6/2017 |
| WO | 2019085769 A1 | 5/2019 |

OTHER PUBLICATIONS

Search Report and Written Opinion for International Application No. PCT/IB2020/052288, dated Aug. 17, 2020, 8 pages.
Search Report and Written Opinion for Singapore Application No. 10201913065Q, dated Sep. 25, 2020, 5 pages.
Australian Patent Office, Office Action Issued in Application No. 2020294214, dated Sep. 7, 2021, 4 pages.
Macao Intellectual property office, Office Action and Search Report Issued in Application No. I/1674, dated Dec. 7, 2021, 24 pages.

* cited by examiner

EDGE DEVICE TRIGGERING A WRITE-AHEAD LOGGING (WAL) LOG WHEN ABNORMAL CONDITION OCCURS

CROSS REFERENCE TO RELATED APPLICATIONS

This application is a continuation of International Application No. PCT/IB2020/052288, filed on Mar. 13, 2020, which claims priority to Singaporean Patent Application No. 10201913065Q entitled "DATA PROCESSING METHOD AND APPARATUS, AND EDGE DEVICE" and filed on Dec. 23, 2019, all of which are incorporated herein by reference in their entirety.

TECHNICAL FIELD

The present disclosure relates to the technical field of edge computing, and in particular, to a data processing method and apparatus, and an edge device.

BACKGROUND

Due to the continuous extension of Internet of Things service and the explosive growth of data of Internet of Things terminals, to implement real-time processing of data, some data can be distributed to an edge device close to a data source for processing, and other important data still needs to be transmitted back to a cloud. To ensure that this part of data can be reliably transmitted back to the cloud, a data processing manner in an abnormal situation such as network disconnection and a power failure needs to be improved.

SUMMARY

The present disclosure provides a data processing method and apparatus, and an edge device.

Specifically, the present disclosure is implemented by means of the following technical solutions.

According to a first aspect of embodiments of the present disclosure, a data processing method is provided, and the method includes:
  writing a currently received message to a first area of a local disk;
  upon writing the currently received message to the first area of the local disk, buffering the currently received message to a cache; and
  after a device comprising the local disk and the cache is restarted, restoring data in the cache according to data stored in the first area of the local disk.

In some embodiments, writing the currently received message to the first area of the local disk includes:
  writing the currently received message to a Write-Ahead Logging (WAL) log.

In some embodiments, the method further includes:
reading data of a message numbered k+1 from the cache, wherein k is the number of a last message successfully sent to a cloud device, the number of a message is determined according to an order in which the message is received, and k is a positive integer; and
sending the read data to the cloud device.

In some embodiments, the method further includes:
when a preset condition is satisfied, saving all data in the cache to a second area of the local disk and emptying the cache.

In some embodiments, when a preset condition is satisfied, saving all data in the cache to a second area of the local disk and emptying the cache includes:
  compressing all the data in the cache; and
  saving the compressed data to the second area of the local disk.

In some embodiments, the preset condition comprises at least one of:
  occupied space of the cache reaches a set value of the space of the cache; or
  a time interval between a current time and a time when the cache was emptied last time reaches a preset time threshold.

In some embodiments, the method further includes:
for each time the cache is emptied,
writing a message received after emptying the cache to the first area of the local disk to overwrite data stored in the first area of the local disk before emptying the cache; and
upon writing the message received after emptying the cache to the first area of the local disk, buffering the message received after emptying the cache to the cache.

In some embodiments, after saving all the data in the cache to the second area of the local disk and emptying the cache, the method further includes:
when a message numbered m+1 is stored in the cache, reading data of the message numbered m+1 from the cache, wherein m is the number of a last message successfully sent to a cloud device, the number of a message is determined according to an order in which the message is received, and m is a positive integer; and
sending the read data to the cloud device.

In some embodiments, the method further includes:
when no message numbered m+1 is stored in the cache, reading the data of the message numbered m+1 from the second area of the local disk; and
sending the read data to the cloud device.

According to a second aspect of the embodiments of the present disclosure, a data processing apparatus is provided, and the apparatus includes:
  a first writing module, configured to write a currently received message to a first area of a local disk;
  a first buffering module, configured to, upon writing the currently received message to the first area of the local disk, buffer the currently received message to a cache; and
  a data restoring module, configured to, after a device comprising the local disk and the cache is restarted, restore data in the cache according to data stored in the first area of the local disk.

In some embodiments, the first writing module is configured to:
  write the currently received message to a WAL log.

In some embodiments, the apparatus further includes:
  a first reading module, configured to read data of a message numbered k+1 from the cache, wherein k is the number of a last message successfully sent to a cloud device, the number of a message is determined according to an order in which the message is received, and k is a positive integer; and
  a first sending module, configured to send the read data to the cloud device.

In some embodiments, the apparatus further includes:
  a saving module, configured to, when a preset condition is satisfied, save all data in the cache to a second area of the local disk and empty the cache.

In some embodiments, the saving module is configured to:
compress all the data in the cache; and
save the compressed data to the second area of the local disk.

In some embodiments, the preset condition comprises at least one of:
occupied space of the cache reaches a set value of the space of the cache; or
a time interval between a current time and a time when the cache was emptied last time reaches a preset time threshold.

In some embodiments, the apparatus further includes:
for each time the cache is emptied,
a second writing module, configured to write a message received after emptying the cache to the first area of the local disk to overwrite data stored in the first area of the local disk before emptying the cache; and
a second buffering module, configured to, upon writing the message received after emptying the cache to the first area of the local disk, buffer the message received after emptying the cache to the cache.

In some embodiments, the apparatus further includes:
a second reading module, configured to, when a message numbered m+1 is stored in the cache, read data of the message numbered m+1 from the cache, wherein m is the number of a last message successfully sent to a cloud device, the number of a message is determined according to an order in which the message is received, and m is a positive integer; and
a second sending module, configured to send the read data to the cloud device.

In some embodiments, the apparatus further includes:
a third reading module, configured to, when no message numbered m+1 is stored in the cache, read the data of the message numbered m+1 from the second area of the local disk; and
a third sending module, configured to send the read data to the cloud device.

According to a third aspect of the embodiments of the present disclosure, a non-volatile computer readable storage medium is provided, the computer readable storage medium storing a computer program that, when is executed by a processor, cause the processor to implement the data processing method according to the first aspect.

According to a fourth aspect of the embodiments of the present disclosure, an edge device is provided, and the edge device includes a processor and a memory for storing a computer program executable by the processor, where the processor is configured to execute the program to implement the method according to the first aspect.

According to the embodiments of the present disclosure, a currently received message is written to a first area of a local disk, and upon writing the currently received message to the first area of the local disk, the currently received message is buffered to a cache. When an edge device crashes abnormally and a service is restarted, data in the cache may be restored according to data stored in the first area of the local disk, thereby ensuring that data of a data source received by the edge device is not lost.

It should be understood that the above general description and the following detailed description are merely exemplary and explanatory, and are not intended to limit the present disclosure.

BRIEF DESCRIPTION OF THE DRAWINGS

The accompanying drawings here, which are incorporated in and constituted a part of the description, illustrate embodiments of the present disclosure and are intended to explain the technical solutions of the present disclosure together with the description.

DETAILED DESCRIPTION OF THE EMBODIMENTS

Exemplary embodiments are explained in detail herein, examples of which are illustrated in the accompanying drawings. When the following description refers to the accompanying drawings, the same numerals in different drawings represent the same or similar elements unless otherwise indicated. The implementations described in the following exemplary embodiments do not represent all implementations consistent with the present application. On the contrary, they are merely examples of the apparatuses and methods consistent with some aspects of the present application as detailed in the appended claims.

The terms used in the present application are for the purpose of describing particular embodiments only, and are not intended to limit present application. The singular forms "a", "said", and "the" as used in the present application and the appended claims are intended to include the plural forms as well, unless the context clearly indicates something else. It should also be understood that the term "and/or" as used herein refers to and includes any or all possible combinations of one or more of the associated listed items. In addition, the term "at least one" herein means any one of a plurality or any combination of at least two of the plurality.

It should also be understood that, although the terms such as "first", "second", and "third" may be used in the present application to describe various information, such information should not be limited to these terms. These terms are only used to distinguish the same type of information from each other. For example, without departing from the scope of the present application, first information may also be referred to as second information, and similarly, the second information may also be referred to as the first information. Depending on the context, the term "if" as used herein may be interpreted as "upon . . . " or "when . . . " or "in response to determining".

In order to enable a person skilled in the art to better understand the technical solutions in the embodiments of the present disclosure, and to make the above-mentioned purposes, features, and advantages of the embodiments of the present disclosure more obvious and understandable, the technical solutions in the embodiments of the present disclosure are further explained in detail below in combination with the accompanying drawings.

Edge computing refers to an open platform that uses core capabilities of a network, computing, storage, and application on a side close to an object or a data source to provide the nearest-end services nearby. Its application program is initiated at an edge side, thereby producing a faster network service response, and satisfying the basic demands of industries in real-time service, application intelligence, security and privacy protection, and the like. Internet of Things is one of important applications of edge computing technology. In an application scenario of Internet of Things, to implement real-time processing of data, some data is distributed to an edge device close to a data source for processing, and other important data is to be transmitted back to a cloud.

Figure 1:
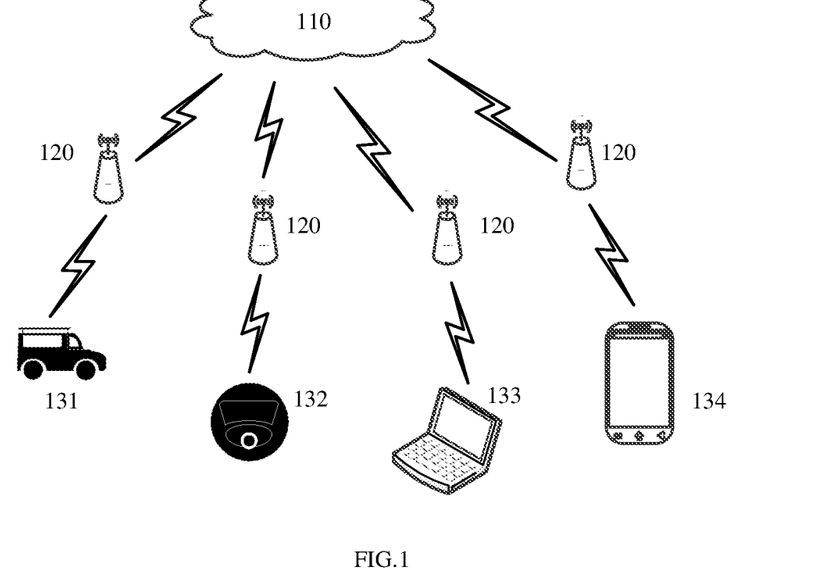
FIG. 1 is a schematic diagram of an application scenario according to the embodiments of the present disclosure.

FIG. 1 is a schematic diagram of an application scenario according to the embodiments of the present disclosure. It can be understood that the application scenario is merely one possible application scenario of the embodiments of the present disclosure, and is not intended to limit the present disclosure. An edge device may be a device such as a vehicle-mounted server 131, a monitoring system 132, a notebook computer 133, and a mobile phone 134, and the edge device may be connected to a cloud 110 through a network 120. For example, the vehicle-mounted server 131 may process road information and vehicle information acquired by various vehicle sensors, so that assistance driving and automatic driving are implemented. For another example, the monitoring system 132 may obtain a monitoring object acquired by a monitoring camera, so as to track the monitoring object. Because such data requires high real-time performance, an edge device close to the data source may be used for processing the data. For some more complicated and important data integration, data analysis, and other processes, data is to be sent from the edge device to a cloud device, and then processed by the cloud device.

Figure 2:
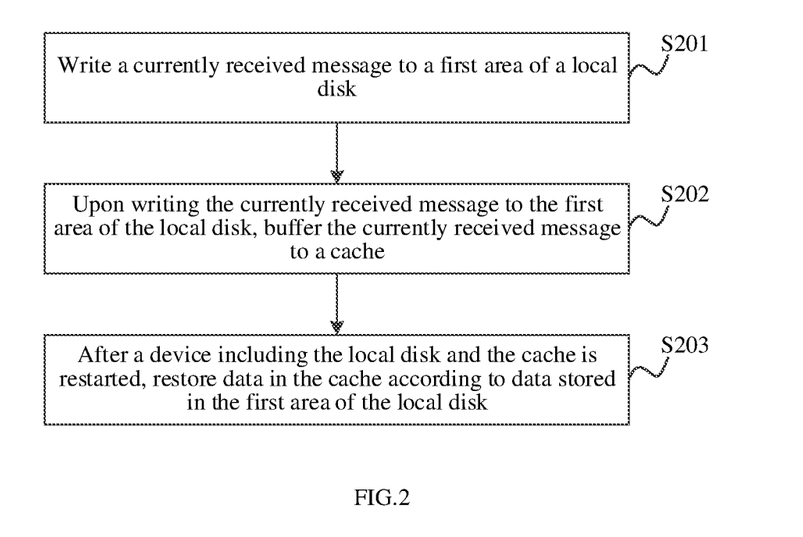
FIG. 2 is a flow chart of a data processing method according to the embodiments of the present disclosure.

However, the network environment is more complicated in an Internet of Things scenario, network disconnection may often occur, and sometimes, the network disconnection lasts for a long time. As a result, some important data may not be reliably transmitted back to the cloud. In this regard, the embodiments of the present disclosure provide a data processing method. As shown in FIG. 2, the method may include the following steps.

Step S201: a currently received message is written to a first area of a local disk.

Step S202: upon writing the currently received message to the first area of the local disk, the currently received message is buffered to a cache.

Step S203: after a device including the local disk and the cache is restarted, data in the cache is restored according to data stored in the first area of the local disk.

In step S201, the currently received message may be various types of messages, such as a control message, a request message, a response message, or the like. The message may be important data which requires to be sent to a cloud device. Each time an edge device receives a message from a data source, e.g., a client device, the edge device assigns a number to the message, and the number is strictly and progressively increased according to the time when the message is received. That is to say, each message has a number, i.e., a seqID (Sequence Identifier), for uniquely identifying the message. The seqID is strictly and progressively increased. For example, if a message with a seqID of n is received at time T1, the seqID of the next message received is n+1, the seqID of the still next message received is n+2, and so on. Each time a message is received, the message may be written to the first area of the local disk to implement persistence processing of the message.

Persistence is a mechanism that converts program data from a transient state to a persistent state. The cache is a type of volatile memory. The local disk is a type of non-volatile memory. Generally, transient data that cannot be saved permanently (such as data in the cache) is persisted into persistent data that can be saved for a long time (such as data in local disk). By persistence, data would not be lost in an abnormal situation such as a power failure and network disconnection.

In some embodiments, the currently received message may be written into a WAL log. The WAL refers to Write-Ahead Logging, i.e., a write-ahead logging system. Writing the currently received messages to the WAL log is for backing up the received message. After the edge device is restarted due to a power failure or other reasons, the currently received message may be read from the WAL, and then the read currently received message is buffered to the cache, so as to ensure that data is not lost.

In step S202, because the currently received message is written into the first area of the local disk, and the currently received message is also buffered to the cache, a backup of the currently received message in the cache may be found in the local disk. When an abnormal situation such as a power failure or restarting occurs, the corresponding message may be found from the first area of the local disk, and the data in the cache is restored, thereby ensuring that the data in the cache is not lost. When the edge device works normally, the data may be read directly from the cache.

In some embodiments, when a message successfully sent to the cloud device, the edge device may record the number of the message, that is, the sequence identifier of the message. data of a message numbered k+1 may be read from the cache, and the read data is sent to a cloud device, where k is the number of a last message successfully sent to the cloud device, the number of a message is determined according to an order in which the message is received, and k is a positive integer. When an abnormal situation such as network disconnection occurs between the edge device and the cloud device during a process of sending the message numbered k+1, after the network is recovered, data, e.g., the message numbered k+1 and subsequent messages, may be read from the cache and re-sent to the cloud device, so as to ensure that messages, which are to be sent to the cloud device, in the received data are not lost.

In some embodiments, when the currently received message is buffered to the cache, data compression processing may also be performed on the currently received message in the cache. By data compression, the amount of data in the cache may be reduced and the utilization of the cache may be improved.

In some embodiments, if a preset condition is satisfied, all data in the cache may be saved to a second area of the local disk, and the cache is emptied. In the embodiment, when a preset condition is satisfied, all messages in the cache may be persistently processed to a local disk, and the cache is emptied. If the cache includes message 1, message 2, . . . , and message n currently, message 1, message 2, . . . , and message n may all be saved to the second area of the local disk, and the cache is emptied.

The preset condition may include at least one of the following: occupied space of the cache reaches a set value of the space of the cache; or a time interval between the current time and the time when the cache was emptied last time reaches a preset time threshold. Because capacity of the cache is limited, emptying the cache according to the preset condition may avoid data loss due to cache overflow. Moreover, the messages in the cache are persisted to the second area of the local disk, which may back up the data in the cache and prevent data loss.

Moreover, to reduce the amount of data in the local disk and improve the utilization of the local disk, the data in the cache may be compressed, and the compressed data is saved to the second area of the local disk.

Each time messages in the cache are saved to the second area of the local disk, a file may be generated in the second area of the local disk for storing the messages in the cache. The file may be named according to a seqID of a first message in the cache. For example, at time T1, messages with the seqIDs from 000000 to 000199 are buffered in the cache, then the 200 messages may be stored in a file in the local disk, and the file is named 000000. At time T2 (time T2 is after time T1), messages with the seqIDs from 000200 to 000399 are buffered in the cache, then the 200 messages may be stored in another file in the local disk, and the file is named 000200.

A message may be searched according to the file name of the file in the local disk used for persisting the messages in the cache. During search, the file names of files may be sorted, and then according to a seqID of the message and a starting seqID corresponding to each file name, the file where the seqID of the message is located may be searched by dichotomy.

In some embodiments, for each time the cache is emptied, a message received after emptying the cache may also be written to the first area of the local disk, so as to overwrite the data stored in the first area of the local disk before emptying the cache; and upon writing the message received after emptying the cache to the first area of the local disk, the message received after emptying the cache is buffered to the cache. In this way, the messages in the first area of the local disk may be kept consistent with the messages in the cache. Because the first area of the local disk is used to back up the cache, the first area of the local disk only can save the latest message.

By using a new message received after emptying the cache to overwrite the original data in the first area of the local disk, the amount of data stored in the local disk may be reduced. In some embodiments, a WAL log may be newly created in the first area of the local disk, and the file name of the newly created WAL log may be the same as the file name of the original WAL log, so as to overwrite and delete the original WAL file.

After all the data in the cache is saved to the second area of the local disk and the cache is emptied, and when a message numbered m+1 is stored in the cache, data of the message numbered m+1 may be read from the cache, and the read data is sent to the cloud device, where m is the number of a last message successfully sent to the cloud device, the number of a message is determined according to an order in which the message is received, and m is a positive integer.

Furthermore, when no message numbered m+1 is stored in the cache, the data of the message numbered m+1 is read from the second area of the local disk, and the read data is sent to the cloud device.

In practical application, currently received messages are continuously sent to the cache. In a normal (the edge device is online) situation, the currently received message may be directly read from the cache and sent to the cloud device. If network disconnection occurs, but the network disconnection time is relatively short, messages generated during the network disconnection may be stored in the cache without overflowing. Therefore, after the network is recovered, the next message (e.g., a message numbered m+1) of the last message successfully sent to the cloud device (e.g., a message numbered m) may still be read from the cache and sent to the cloud device, so as to ensure that messages, which are to be sent to the cloud device, in the received data are not lost.

If the network disconnection lasts for a long time, not all messages generated during the network disconnection can be stored in the cache. To avoid data loss, the messages in the cache are maintained in the second area of the local disk. In this way, after the network is recovered, when the next message of the last message successfully sent to the cloud device cannot be read from the cache, the next message of the last message successfully sent to the cloud device may be read from the second area on the local disk and sent to the cloud device, so as to ensure that messages, which are to be sent to the cloud device, in the received data are not lost.

The embodiments of the present disclosure are applicable to an Internet of Things scenario, and may improve the reliability of transmission of important data. When the resources of the cache and the local disk are limited, messages are persisted to the local disk to ensure long-term data retention. According to the embodiments of the present disclosure, the reliability of data transmission can be ensured when offline for a long time, while data can be directly read from the cache when offline for a short time, so that the data transmission performance is not lost.

Figure 3:
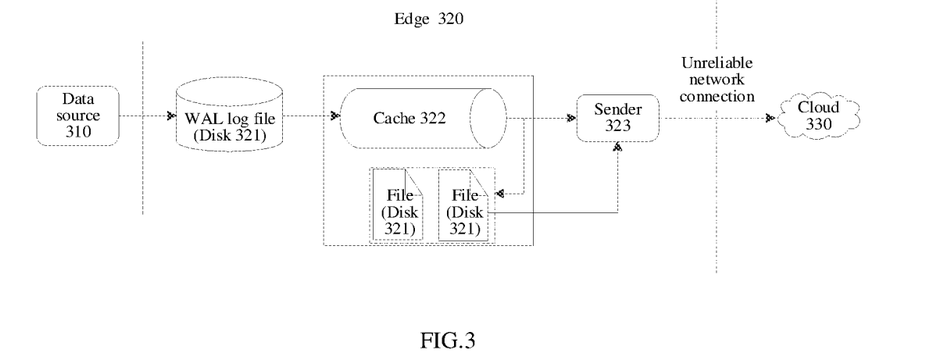
FIG. 3 is a schematic diagram of a data transmission process between an edge device and a cloud device according to the embodiments of the present disclosure.

A schematic diagram of a data transmission process between an edge device and a cloud device according to the embodiments of the present disclosure is shown in FIG. 3. At an edge device 320, a message generated by a data source 310 may be stored in a WAL log file to be persisted to a local disk 321; when the persistence is successful, the message is stored in a cache 322; and when the cache 322 is full, the data in the cache 322 is compressed and stored in the local disk 321, and the cache is emptied. A sender 323 in the edge device 320 may search for a message from the cache 322 and send it to a cloud device 330. When the edge device 320 is normal situation or offline for a short time, the corresponding message may be found in the cache 322. When the edge device 320 is offline for a long time, the corresponding message cannot be found in the cache 322. In this case, the sender 323 searches for the corresponding message in the local disk 321 and sends it to the cloud device 330.

The method of data processing may be implemented by an edge device according to the embodiments of the present disclosure, where the edge device may be a device such as a vehicle-mounted server, a monitoring system, a notebook computer, and a mobile phone in the application scenario shown in FIG. 1. By the embodiments of the present disclosure, data loss may be prevented when the edge device is abnormally powered off or the network connection between the edge device and the cloud device is disconnected.

A person skilled in the art can understand that, in the foregoing methods of the specific implementations, the order in which the steps are written does not imply a strict execution order which constitutes any limitation to the implementation process, and the specific order of executing the steps should be determined by functions and possible internal logics thereof.

Figure 4:
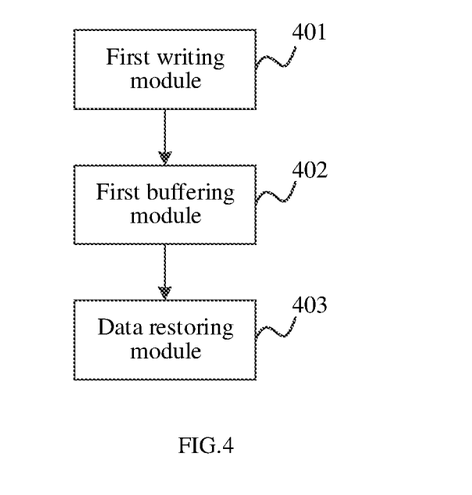
FIG. 4 is a block diagram of a data processing apparatus according to the embodiments of present disclosure.

As shown in FIG. 4, the present disclosure further provides a data processing apparatus, and the apparatus includes the following modules:
 a first writing module 401 is configured to write a currently received message to a first area of a local disk;
 a first buffering module 402 is configured to, upon writing the currently received message to the first area of the local disk, buffer the currently received message to a cache; and
 a data restoring module 403 is configured to, after a device including the local disk and the cache is restarted, restore data in the cache according to data stored in the first area of the local disk.

In some embodiments, the first writing module is configured to: write the currently received message to a WAL log.

In some embodiments, the apparatus further includes: a first reading module, configured to read data of a message numbered k+1 from the cache, wherein k is the number of a last message successfully sent to a cloud device, the number of a message is determined according to an order in which the message is received, and k is a positive integer; and a first sending module, configured to send the read data to the cloud device.

In some embodiments, the apparatus further includes: a saving module, configured to, when a preset condition is satisfied, save all data in the cache to a second area of the local disk and empty the cache.

In some embodiments, the saving module is configured to: compress all the data in the cache; and save the compressed data to the second area of the local disk.

In some embodiments, the preset condition includes at least one of the following conditions: occupied space of the cache reaches a set value of the space of the cache; or a time interval between a current time and a time when the cache was emptied last time reaches a preset time threshold.

In some embodiments, the apparatus further includes: for each time the cache is emptied, a second writing module, configured to write a message received after emptying the cache to the first area of the local disk to overwrite data stored in the first area of the local disk before emptying the cache; and a second buffering module, configured to, upon writing the message received after emptying the cache to the first area of the local disk, buffer the message received after emptying the cache to the cache.

In some embodiments, the apparatus further includes: a second reading module, configured to, when a message numbered m+1 is stored in the cache, read data of the message numbered m+1 from the cache, wherein m is the number of a last message successfully sent to a cloud device, the number of a message is determined according to an order in which the message is received, and m is a positive integer; and a second sending module, configured to send the read data to the cloud device.

In some embodiments, the apparatus further includes: a third reading module, configured to, when no message numbered m+1 is stored in the cache, read the data of the message numbered m+1 from the second area of the local disk; and a third sending module, configured to send the read data to the cloud device.

In some embodiments, the functions provided by or the modules included in the apparatus according to the embodiments of the present disclosure may be used for implementing the methods described in the foregoing method embodiments. For specific implementations, reference may be made to the description in the method embodiments above. For the purpose of brevity, details are not described here again.

The foregoing described apparatus embodiments are merely illustrative. The modules described as separate parts may or may not be physically separated, and the parts displayed as modules may or may not be physical modules, e.g., may be located in one position, or may be distributed to a plurality of network modules. Some or all of the modules may be selected according to actual needs to implement the purpose of the solutions in the present description. A person of ordinary skill in the art may understand and implement them without involving an inventive effort.

Figure 5:
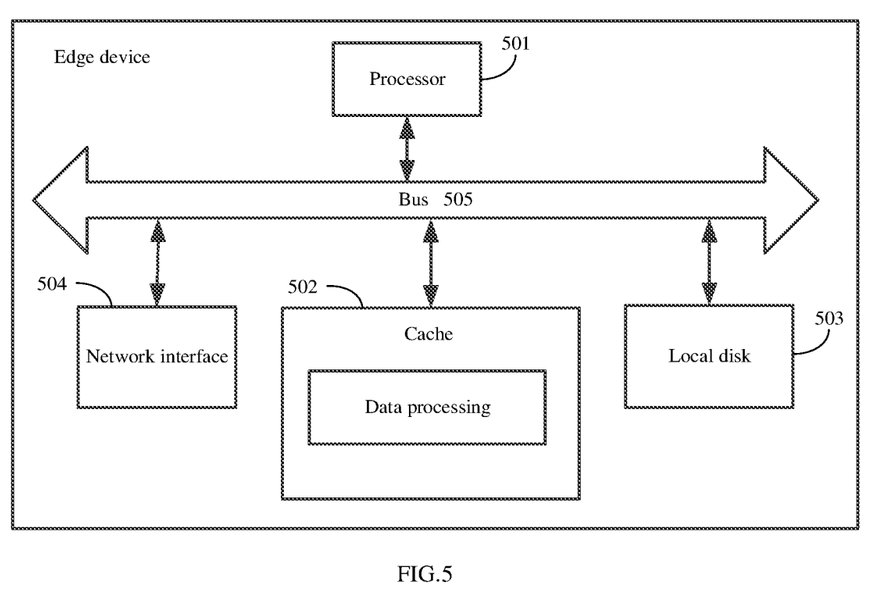
FIG. 5 is a block diagram of an edge device for implementing a method of the present disclosure according to the embodiments of the present disclosure.

The apparatus embodiments of the present disclosure may be applied to an edge device, such as a server or a terminal device. The apparatus embodiments may be implemented by software, or implemented by hardware or a combination of software and hardware. Taking software implementation as an example, as an apparatus in a logical sense, it is formed by reading corresponding computer program instructions from a non-volatile memory to a cache and cause a processor for data processing of the apparatus. For hardware, FIG. 5 shows a hardware structural diagram of an edge device in which the apparatus is located according to the present disclosure. In addition to a processor 501, a cache 502, and a local disk 503 shown in FIG. 5, the server or electronic device in which the apparatus of the embodiments is located may further include a network interface 504 and a bus 505. In some apparatus embodiments, other hardware may be included according to the actual functions of the edge device, which is not limited herein.

Accordingly, the embodiments of the present disclosure further provide a computer storage medium storing a computer program. When the program is executed by a processor, cause the processor to implement the data processing method according to any one of the embodiments.

Accordingly, the embodiments of the present disclosure further provide an edge device, including a memory, a processor, and a computer program stored on the memory and capable of running on the processor, where when the processor executes the program, the method according to any one of the embodiments is implemented.

In the present disclosure, a form of a computer program product implemented on one or more storage media (including, but not limited to, a disk memory, a Compact Disc Read-Only Memory (CD-ROM), an optical memory, etc.) including program codes may be used. A computer readable storage medium includes permanent and non-permanent, movable and non-movable medium, and information storage can be implemented by any method or technology. Information may be a computer readable command, a data structure, a module of a program or other data. Examples of the computer storage medium include, but are not limited to, a Phase Change Random Access Memory (PRAM), a Static Random Access Memory (SRAM), a Dynamic Random Access Memory (DRAM), other types of Random Access Memories (RAMs), a Read-Only Memory (ROM), an Electrically Erasable Programmable Read-Only Memory (EEPROM), a flash memory or other cache technologies, a CD-ROM, a Digital Video Disk (DVD) or other optical storage, and a magnetic tape cartridge. Magnetic tape disk storage, other magnetic storage devices or any other non-transmission medium can be used for storing information that can be accessed by a computing device.

After considering the description and practicing the description disclosed herein, a person skilled in the art would easily conceive of other implementation solutions of the present disclosure. The present disclosure aims at including any variations, uses or adaptive changes of the present disclosure. These variations, uses or adaptive changes follow the general principles of the present disclosure and include common general knowledge or common technical means in the technical field that are not disclosed in the present disclosure. The description and embodiments are merely viewed as exemplars, and the true scope and spirit of the present disclosure are pointed out in the following claims.

It should be understood that the present disclosure is not limited to the accurate structures described above and shown in the accompanying drawings, and various modifications and changes can be made without departing from the scope of the present disclosure. The scope of the present disclosure is only limited by the appended claims.

The above descriptions are merely some embodiments of the present disclosure and are not intended to limit the present disclosure. Any modification, equivalent replacement, or improvement made within the spirit and principle of the present disclosure shall fall within the scope of protection of the present disclosure.

The descriptions of the embodiments above tend to focus on differences between the embodiments, and for same or similar parts in the embodiments, refer to these embodiments. For the purpose of brevity, details are not described again.

The invention claimed is:

1. A data processing method, comprising:
   writing a currently received message to a first area of a local disk;
   upon writing the currently received message to the first area of the local disk, buffering the currently received message to a cache;
   after a device comprising the local disk and the cache is restarted, restoring data in the cache according to data stored in the first area of the local disk; and
   when a preset condition is satisfied, saving all data in the cache to a second area of the local disk and emptying the cache;
   wherein saving all data in the cache to the second area of the local disk comprises:
   compressing all the data in the cache; and
   saving the compressed data to the second area of the local disk.

2. The method according to claim 1, wherein writing the currently received message to the first area of the local disk comprises:
   writing the currently received message to a Write-Ahead Logging (WAL) log.

3. The method according to claim 1, further comprising:
   reading data of a message numbered k+1 from the cache, wherein k is a number of a last message successfully sent to a cloud device, a number of a message is determined according to an order in which the message is received, and k is a positive integer; and
   sending the read data to the cloud device.

4. The method according to claim 1, wherein the preset condition comprises at least one of:
   occupied space of the cache reaches a set value of a space of the cache; or
   a time interval between a current time and a time when the cache was emptied last time reaches a preset time threshold.

5. The method according to claim 1, further comprising:
   for each time the cache is emptied,
   writing a message received after emptying the cache to the first area of the local disk to overwrite the data stored in the first area of the local disk before emptying the cache; and
   upon writing the message received after emptying the cache to the first area of the local disk, buffering the message received after emptying the cache to the cache.

6. The method according to claim 5, wherein after saving all the data in the cache to the second area of the local disk and emptying the cache, the method further comprises:
   when a message numbered m+1 is stored in the cache, reading data of the message numbered m+1 from the cache, wherein m is a number of a last message successfully sent to a cloud device, a number of a message is determined according to an order in which the message is received, and m is a positive integer; and
   sending the read data to the cloud device.

7. The method according to claim 6, further comprising:
   when no message numbered m+1 is stored in the cache, reading the data of the message numbered m+1 from the second area of the local disk; and
   sending the read data to the cloud device.

8. A non-transitory computer-readable storage medium storing a computer program that, when executed by a processor, cause the processor to:
   write a currently received message to a first area of a local disk;
   upon writing the currently received message to the first area of the local disk, buffer the currently received message to a cache;
   after a device comprising the local disk and the cache is restarted, restore data in the cache according to data stored in the first area of the local disk; and
   when a preset condition is satisfied, save all data in the cache to a second area of the local disk and empty the cache;
   wherein saving all data in the cache to the second area of the local disk comprises:
   compressing all the data in the cache; and
   saving the compressed data to the second area of the local disk.

9. An edge device, comprising:
   a processor, and
   a memory for storing a computer program executable by the processor,
   wherein the processor is configured to:
   write a currently received message to a first area of a local disk;
   upon writing the currently received message to the first area of the local disk, buffer the currently received message to a cache;
   after a device comprising the local disk and the cache is restarted, restore data in the cache according to data stored in the first area of the local disk; and
   when a preset condition is satisfied, save all data in the cache to a second area of the local disk and empty the cache;
   wherein saving all data in the cache to the second area of the local disk comprises:
   compressing all the data in the cache; and
   saving the compressed data to the second area of the local disk.

10. The edge device according to claim 9, wherein writing the currently received message to the first area of the local disk comprises:
    writing the currently received message to a Write-Ahead Logging (WAL) log.

11. The edge device according to claim 9, the processor is further configured to:
    read data of a message numbered k+1 from the cache, wherein k is a number of a last message successfully sent to a cloud device, a number of a message is determined according to an order in which the message is received, and k is a positive integer; and
    send the read data to the cloud device.

12. The edge device according to claim 9, wherein the preset condition comprises at least one of:
    occupied space of the cache reaches a set value of a space of the cache; or a time interval between a current time and a time when the cache was emptied last time reaches a preset time threshold.

13. The edge device according to claim 9, the processor is further configured to:
for each time the cache is emptied,
write a message received after emptying the cache to the first area of the local disk to overwrite the data stored in the first area of the local disk before emptying the cache; and
upon writing the message received after emptying the cache to the first area of the local disk, buffer the message received after emptying the cache to the cache.

14. The edge device according to claim 13, wherein after saving all the data in the cache to the second area of the local disk and emptying the cache, the processor is further configured to:
when a message numbered m+1 is stored in the cache, read data of the message numbered m+1 from the cache, wherein m is a number of a last message successfully sent to a cloud device, a number of a message is determined according to an order in which the message is received, and m is a positive integer; and
send the read data to the cloud device.

15. The edge device according to claim 14, the processor is further configured to:
when no message numbered m+1 is stored in the cache, read the data of the message numbered m+1 from the second area of the local disk; and
send the read data to the cloud device.

\* \* \* \* \*